United States Patent [19]

Roberson, Jr.

[11] 4,079,655

[45] Mar. 21, 1978

[54] TOGGLE BOLT

[76] Inventor: Walter Herman Roberson, Jr., 1002 Raymond Ave., Altamonte Springs, Fla. 32701

[21] Appl. No.: 759,034

[22] Filed: Jan. 13, 1977

[51] Int. Cl.² .............................................. F16B 37/00
[52] U.S. Cl. ...................................................... 85/3 S
[58] Field of Search .......................... 85/3 S, 3 R, 3 K; 24/211 P, 211 R

[56] References Cited

U.S. PATENT DOCUMENTS

| 1,357,821 | 11/1920 | Pierce | 85/3 S |
| 2,144,895 | 1/1939 | Place | 85/3 S |
| 3,513,746 | 5/1970 | Forsberg | 85/3 R |
| 3,532,024 | 10/1970 | Gutshall | 85/3 R X |

FOREIGN PATENT DOCUMENTS 1,127,318  8/1956  France .................................. 85/3 R

*Primary Examiner*—Ramon S. Britts
*Attorney, Agent, or Firm*—Lowe, King, Price & Markva

[57] ABSTRACT

A toggle bolt comprises a bolt having a head, a support member threadingly engaging the bolt and wings pivotally mounted on the support member. Biasing means extend outwardly from the bolt and are pivotally connected at the outer end of each of the wings. The biasing means is effective to urge the wings outwardly from the bolt when the support member is engaged with the bolt. The biasing means are further effective to hold the wings in an attached position with respect to the bolt when the support member becomes disengaged from the bolt.

12 Claims, 8 Drawing Figures

U.S. Patent March 21, 1978 4,079,655
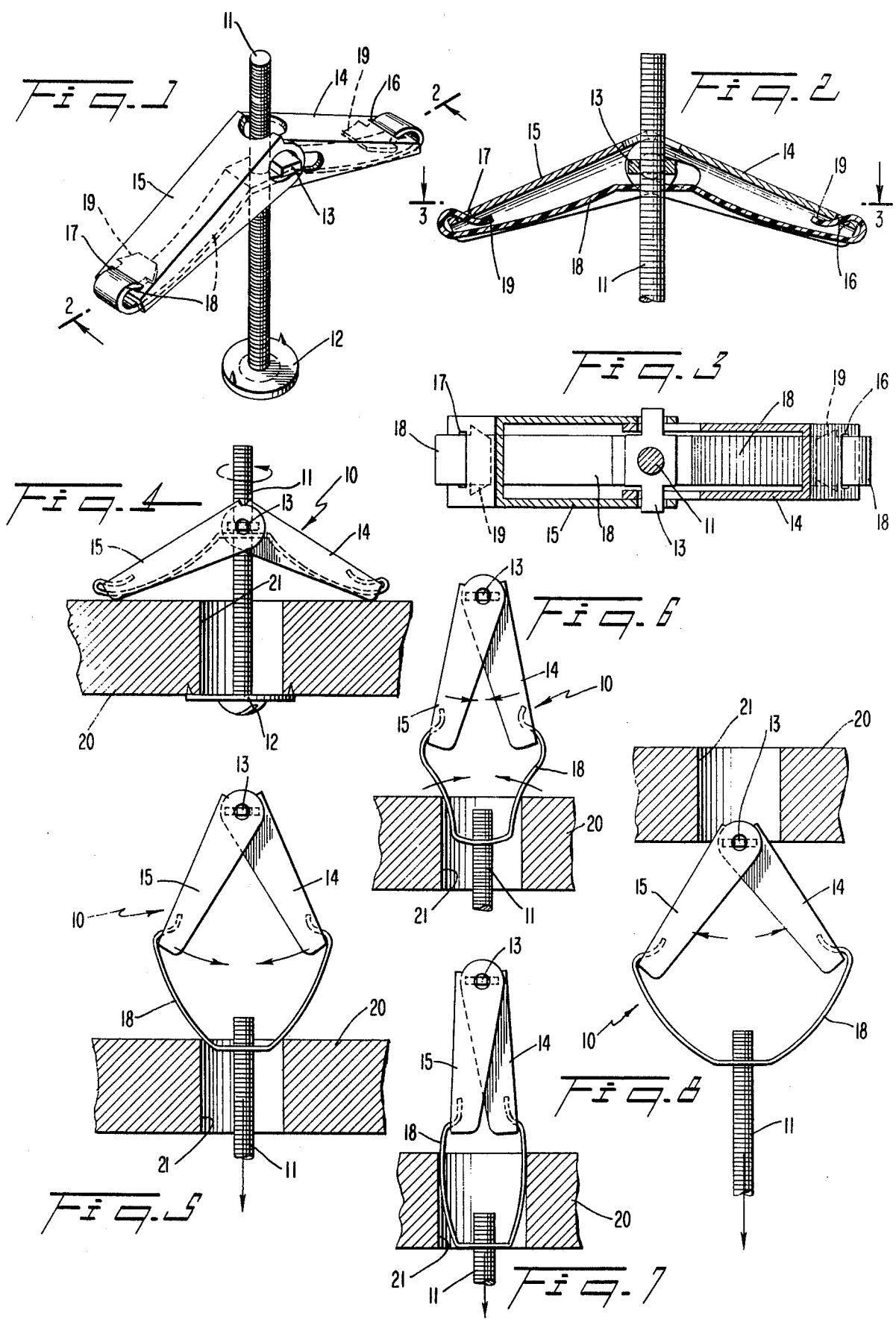

TOGGLE BOLT

BACKGROUND OF THE INVENTION

This invention relates to a toggle bolt. More particularly, the invention relates to a toggle bolt having a configuration for removal from a wall for reuse.

There are several prior art configurations useful with toggle bolts for removing same from the wall in which they are attached. U.S. Pat. No. 2,024,871 discloses a sleeve configuration used in combination with the toggle bolt. Here the sleeve is used to fold the wings inwardly while the wings remain in threaded engagement with the bolt member. Once the wings are folded together, the entire assembly may be removed from the wall.

The U.S. Pat. No. 2,224,023 discloses a particular type of toggle head having a U-shaped configuration. The arms of the U-section are pivotally mounted on the wings which rotate at least 180° while the bolt still remains in threaded engagement with the bolt member. The pivoting action cannot take place until the U-shaped toggle head is very near the outer end of the bolt. Consequently, an extreme amount of care must be taken to avoid the wing assembly from falling off on the other side of the wall to which it had previously been attached. This danger is very real and would destroy the possible reuse of the toggle bolt.

Additionally, the particular construction of these prior art bolts is fairly complex and expensive. Little use is actually made of these prior art configurations.

PURPOSE OF THE INVENTION

The primary object of this invention is to provide a very inexpensive and simple construction for a toggle bolt which may be removed without danger of losing the wing assembly which operates in conjunction with a bolt for fastening members to the wall.

Another object of this invention is to provide a toggle bolt having a biasing means useful to accomplish two different functions.

SUMMARY OF THE INVENTION

These objects and other advantages are accomplished through the invention disclosed and described herein. The toggle bolt comprises a bolt having a head, a support member threadingly engaging the bolt and wings pivotally mounted on the support member. A biasing means extends outwardly from the bolt and is pivotally connected at the outer end of each of the wings. The biasing means is effective to urge the wings outwardly from the bolt when the support member is engaged with the bolt. Further, the biasing means is effective to hold the wings in an attached position with respect to the bolt when the support member becomes disengaged from the bolt. In this latter situation, the toggle bolt may be removed from the opening through which it was initially inserted and attached to the wall.

Another feature of the invention is directed to the embodiment wherein a single strip of resilient, flexible material is connected to the bolt and extends outwardly to be pivotally connected to the outer ends of each of the wing members. Various ways of pivotally connecting these outer ends of the strip member may be effected. In a specific embodiment, the strip is a flat piece of material that loops around the end of each wing member and is thrust through a slot opening located near the end of each of the wings.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is a perspective view of a toggle bolt made in accordance with this invention, FIG. 2 is a fragmentary sectional view taken along 2—2 of FIG. 1, FIG. 3 is a cross-sectional view of the toggle bolt taken along line 3—3 of FIG. 2, FIG. 4 is a toggle bolt shown in an operational holding position mounted to a wall, FIGS. 5 through 8 show various positions of the toggle bolt in accordance with this invention as it is being removed from its operational use mounted to a wall.

DESCRIPTION OF SPECIFIC EMBODIMENTS

More specifically, referring to the drawings, a toggle bolt, generally designated 10, comprises a bolt 11 having a head 12. A pair of wings 14 and 15 are pivotally mounted on a support member 13. The support member 13 is threadingly engaged with the bolt 11. The structure of the wings 14 and 15 and their attachment to the bolt 11 via the support member 13 is very well known. However, other types of wing structures and support members are within the contemplation of this invention.

Wings 14 and 15 include slots 16 and 17, respectively, located at each outer end thereof. A single strip member 18 comprises a biasing means which extends outwardly from the bolt 11 and is pivotally connected at the outer end of each of the wings 14 and 15. Strip member 18 includes oversized end sections 19 which slip through the slots 16 and 17 as shown. That is, the ends 19 wrap around the outer extremity of each wing 14 and 15 and are then disposed directly into the slots 16 and 17.

The toggle bolt 10 is shown in FIG. 4 in an operational use condition mounted to the wall 20. The wings 14 and 15 were folded inwardly against bolt 11 and pressed through the opening 21 in the common fashion. When toggle bolt 10 is in the location as shown in FIG. 4, the biasing strip member 18 acts as a spring. This is the only spring required to operate the toggle bolt 10 of this invention. Thus, strip 18 constitutes a biasing means that is effective to urge the wings 14 and 15 outwardly from the bolt 11 when the support member 13 is engaged with the bolt 11.

The illustrations in FIGS. 5 through 8 show steps involved in removing the toggle bolt 10. First, the support member 13 is unscrewed from the bolt 11. Consequently, the resilient strip member 18 pops the wings 14 and 15 of the toggle bolt in the position shown in FIG. 5 as the bolt 11 is withdrawn from the wall 20 through the opening 21. As bolt 11 is continuously moved through opening 21, wings 14 and 15 are pivoted inwardly toward each other as shown in FIGS. 6 and 7. Once the wings 14 and 15 clear opening 21, strip 18 then resumes its position as shown in FIG. 8 and toggle bolt 10 is ready to be used at another location.

The resilient strip member 18 may be made of any type of material sufficiently elastic and resilient to accomplish the results described above. The material may be plastic, rubber or metal. The use of a strip member 18 eliminates the need for the use of the standard spring used in the construction of known prior art toggle bolts. As shown in FIGS. 5 through 8, the strip member 18 constitutes a biasing means as effective to hold the wings 14 and 15 in an attached position with respect to bolt 11 when the support member 13 becomes disengaged from bolt 11.

Various forms of pivotal connections may be used to connect the outer ends of the strip member 18. It is conceivable that various other types of biasing members may be used in combination with a second nut. It is also possible that more than two wings may be provided on the toggle bolt. In this case, each wing would have to be associated with a biasing mechanism to accomplish the specific results set forth herein.

While the toggle bolt has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A toggle bolt comprising:
   a. a bolt having a head,
   b. a support member threadingly engaging the bolt,
   c. wings pivotally mounted with respect to each other and operatively disposed on the support member, and
   d. biasing means engaging the bolt independently of the support member and extending outwardly from the bolt and having outer ends pivotally connected at the outer end of each of the wings,
   e. the engagement of said biasing means with the bolt being effective to hold the wings in an attached position with respect to the bolt when the support member becomes disengaged from the bolt,
   f. the engagement of said biasing means with the bolt being further effective for moving the wings inwardly toward each other when the support member is disengaged from the bolt to facilitate removal of the toggle bolt from a hole in a workpiece.

2. A toggle bolt as defined in claim 1 wherein said biasing means is threadingly engaged with the bolt.

3. A toggle bolt as defined in claim 1 wherein said biasing means comprises a single strip of material.

4. A toggle bolt as defined in claim 3 wherein said piece of material is composed of a resilient plastic material.

5. A toggle bolt as defined in claim 3 wherein there are two wings on the togge bolt and each of the wings includes an opening disposed at the outer end thereof, said single strip of material is bent at each end thereof, and engages an opening located at the outer end of each wing.

6. A toggle bolt as defined in claim 5 wherein said piece of material is composed of a resilient plastic material.

7. A toggle bolt as defined in claim 1 wherein said biasing means comprises a piece of material that is looped around the outer extremity of each wing and inserted into the opening disposed near the end of each said wing.

8. A toggle bolt as defined in claim 1 wherein said biasing means is disposed on the bolt at a location between the head and the support member.

9. A toggle bolt as defined in claim 1 wherein there are two wings on the toggle bolt and each of the wings includes an opening disposed at the outer end thereof, said single strip of material is bent at each end thereof, and engages said opening located at the outer end of each wing, said strip of material is disposed on the bolt at a location between the head and the support member.

10. A toggle bolt as defined in claim 1 wherein said biasing means is further effective to urge the wings outwardly from the bolt when the support member is engaged with the bolt.

11. In a toggle bolt including a bolt member having a head, a support member wherein the support member threadingly engages the bolt member, and wings operatively disposed on the support member, said wings being pivotally mounted with respect to each other and being urged outwardly from the bolt when the support member is engaged with the bolt, the combination comprising:
   a. means connecting biasing means on the bolt member at a location between the head and support member,
   b. said biasing means enganing the bolt independently of the support member and extending outwardly from the bolt and attached at the outer end of the wings,
   c. the engagement of said biasing means with the bolt member being effective to hold the wings in an attached position with respect to the bolt member when the support member becomes disengaged from the bolt member,
   d. the engagement of said biasing means with the bolt member being further effective for moving the wings inwardly toward each other when the support member is disengaged from the bolt member to facilitate removal of the toggle bolt from a hole in a workpiece.

12. The toggle bolt as defined in claim 11 wherein said connecting means comprises threads.

* * * * *